UNITED STATES PATENT OFFICE.

FRANK LE FLEM, OF PHILADELPHIA, PENNSYLVANIA.

COMBINED HUB AND BRAKE FOR MOTOR-VEHICLES.

SPECIFICATION forming part of Letters Patent No. 705,100, dated July 22, 1902.

Application filed February 28, 1901. Renewed December 16, 1901. Serial No. 86,038. (No model.)

*To all whom it may concern:*

Be it known that I, FRANK LE FLEM, a citizen of the United States, residing at Philadelphia, county of Philadelphia, and State of Pennsylvania, have invented a certain new and useful Improvement in a Combined Hub and Brake for Motor-Vehicles, of which the following is a specification.

My invention relates to a new and useful improvement in a combined hub and brake for motor-vehicles, and has for its object to provide a hub which consists of a stationary axle secured in the frame of the machine, upon which is secured at one end one member of a friction-brake and upon the other end is journaled loosely the motor-driven sprocket, the barrel of the hub being journaled upon a sleeve, which sleeve has a slight longitudinal movement along the stationary axle, this barrel having a flange at either end, one flange constituting the other member of the friction-brake and the flange on the opposite end adapted to come in frictional contact with the motor-driven sprocket when the barrel is forced in that direction. When the barrel is forced in its extreme position in the opposite direction, the flange upon the barrel will come into contact with the stationary flange upon the axle, which will cause the brake to be set. When the barrel is midway between the motor-driven sprocket and the stationary member of the brake, the wheel can run independently and be operated by foot-power, if desired.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
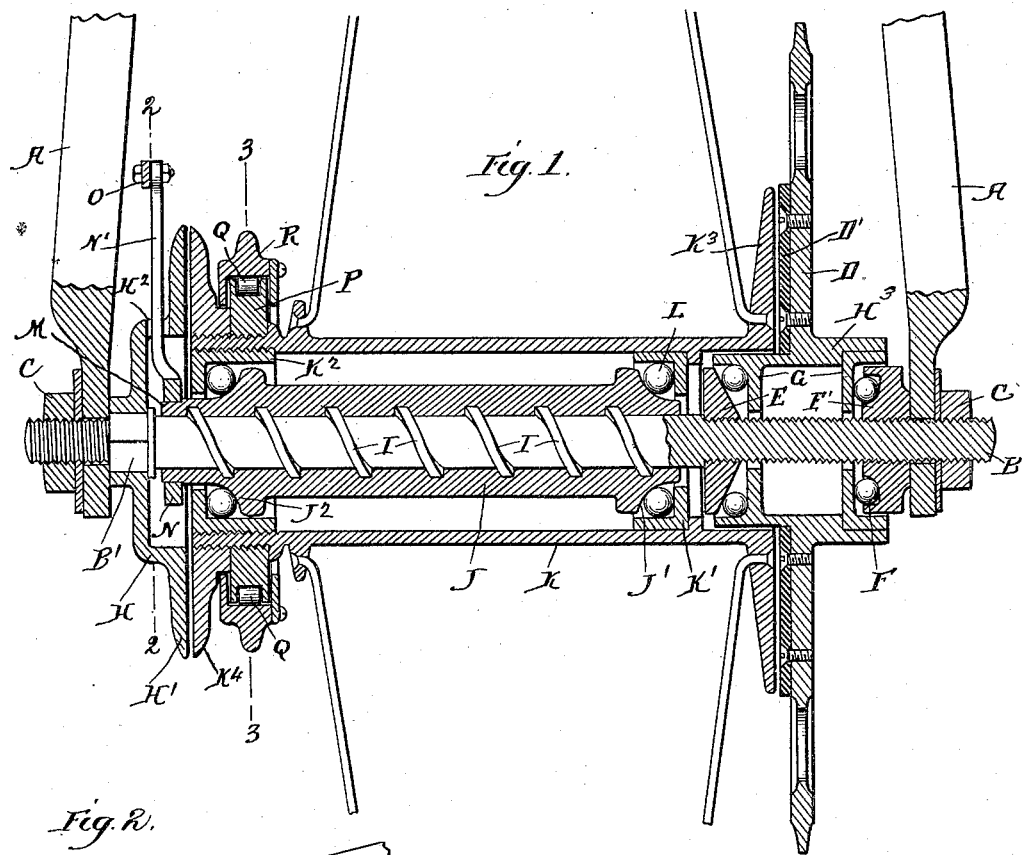
Figure 2:
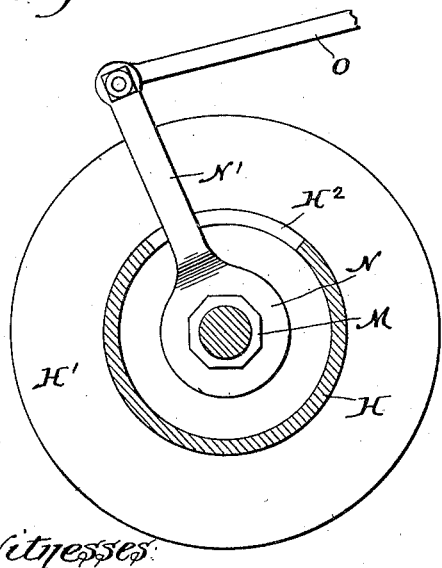
Figure 3:
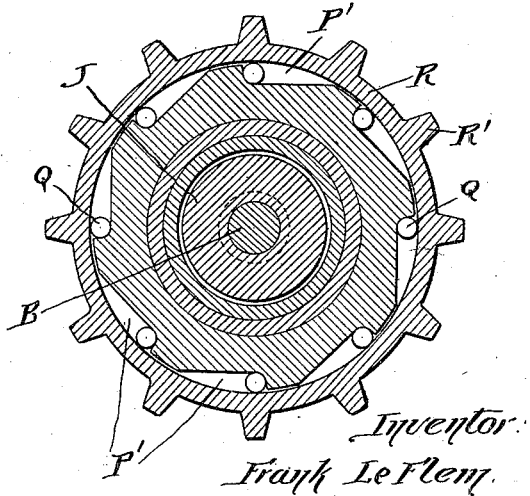

Figure 1 represents a longitudinal section of the hub, showing the barrel in its intermediate position. Fig. 2 is a section on the line 2 2 of Fig. 1, and Fig. 3 is a section on the line 3 3 of Fig. 1.

In carrying out my invention as here embodied, A represents the forks of the frame of the machine, in which is secured the stationary axle B in the usual manner by the nuts C.

D is the motor-driven sprocket-wheel, which is journaled upon the stationary axle B by means of the stationary cone E and the adjustable cone E' and the balls F, which lie between these cones and the bearing-surfaces G, which are formed with or secured in the barrel $H^3$, with which the motor-driven sprocket-wheel D is formed. Upon the opposite end of the stationary axle B is formed a square portion B', upon which is secured the cup-shaped piece H, which has formed with it the annular flange H', which constitutes the stationary member of the brake.

I is a thread which is formed upon the stationary axle, and threaded upon this is a sleeve J, which has formed upon each end bearing-surfaces J' and $J^2$.

K is the barrel of the hub, which has secured upon its interior the stationary bearing-surface K'.

L represents balls which are interposed between the bearing-surfaces J' and K'. $K^2$ is an adjustable bearing-surface, and L' represents balls interposed between this bearing-surface $K^2$ and the bearing-surface $J^2$, formed on the sleeve J. These two series of balls and bearing-surfaces form the bearings for the barrel K, and the barrel K, by being journaled upon the sleeve J, is independent of the stationary axle B. Therefore if the sleeve J is revolved in either direction the barrel K will be caused to travel longitudinally along the stationary axle. For the purpose of revolving this sleeve J, I form one end of the same of polygonal shape, as indicated at M. Upon this is secured a wrench N, which has an arm N' extending up through a slot $H^2$, formed through the cup-shaped piece H. To the upper end of this arm N' is pivoted a connecting-rod O, which is adapted to extend to any suitable point from which it is desired to operate the brake.

$K^3$ is an annular flange formed upon one end of the barrel K. When the sleeve J is revolved in one direction, the barrel K and the flange $K^3$ will be forced toward the motor-driven sprocket-wheel D and cause the flange $K^3$ to be forced into frictional contact with the motor-driven sprocket-wheel D, and thus the barrel, and consequently the wheel of the machine, will be caused to revolve with the sprocket-wheel D. For the purpose of securing better frictional contact between the sprocket-wheel D and the flange K³, I provide upon the sprocket-wheel D a disk D' of rawhide or similar material. Upon the opposite end of the barrel K is secured an annular flange K⁴, which constitutes the movable member of the brake. When the sleeve J is revolved in the opposite direction from that just described, the barrel K, and consequently the flange K⁴, will be caused to travel in the opposite direction, and thus force the flange K⁴ into frictional contact with the flange H', which will cause the speed of the machine to be retarded.

P is a disk which is secured upon the barrel K and has the pockets P' formed therein. Q represents rollers adapted to lie within these pockets. R is a rim which is adapted to encircle the periphery of the disk P and has the sprocket-teeth R' formed thereon. A chain is adapted to encircle this sprocket-wheel, and this chain is adapted to be driven by foot-power, so that when the foot-power is applied to the chain the rim R will clutch the disk P in the well-known manner and cause the barrel K to revolve, and when the machine is being driven by the motor the disk P will revolve independent of the rim R.

When it is desired to use the foot-power for driving the machine or in coasting, the arm N' of the wrench N is placed intermediate of its two extreme positions, and when in this position the flange K⁴ will be out of contact with the flange H', and also the flange K³ will be out of contact with the sprocket-wheel D. Thus the wheel will be free.

The advantages of my invention are that by reason of connecting the wheel to the motor-driven sprocket-wheel by frictional means the machine will be caused to start slowly and without any jerk, and in the case of machines driven by gasolene-motors and the like, which are driven by a series of explosions, the frictional contact will give slightly at each explosion, so as to do away with the jerky motion now observed in such vehicles and cause the same to run evenly and smoothly.

A further advantage of my invention is that by means of the screw-thread a very fine adjustment can be given to the frictional contacts, and in such instances as climbing hills the contact can be very slight, so as to allow the motor to run at nearly full speed and allow the sprocket-wheel D to slip upon the flange K³ slightly, so as to give a slower motion to the wheel, which will add additional power and render it comparatively easy to climb hills, where if the power were applied direct it could not be done.

A further advantage of my invention is that the power is disconnected before the brake is set, and thus the rider has perfect control of the wheel at all times.

Of course I do not wish to be limited to the exact construction here shown, as slight modifications could be made without departing from the spirit of my invention.

Having thus fully described my invention, what I claim as new and useful is—

1. In a motor-driven vehicle-hub, a stationary axle secured in the frame of the machine, a motor-driven sprocket-wheel journaled upon said stationary axle independent of the vehicle-wheel, a frictional surface formed upon the inner face of said motor-driven sprocket-wheel, a frictional surface secured rigidly to the opposite end of the stationary axle, a sleeve arranged upon the stationary axle, a barrel or outside shell of the hub journaled upon said sleeve, frictional surfaces formed upon each end of said barrel, and means under the control of the rider for causing said frictional surfaces upon the barrel to come in contact with either one of their opposed members, or to remain out of contact with both, substantially as described and for the purpose specified.

2. In a motor-vehicle hub, a stationary shaft secured in the framework of the machine, a motor-driven sprocket-wheel journaled upon said shaft, screw-threads formed upon said stationary shaft, a sleeve threaded upon said screw-threads, means under the control of the rider for revolving said sleeve, a barrel forming the outside shell of the hub journaled upon said sleeve, a flange secured to the stationary shaft, a flange secured to one end of the barrel and adapted to be brought into frictional contact with the stationary flange, a frictional surface formed upon the motor-driven sprocket-wheel, a flange formed upon the opposite end of the barrel and adapted to be brought in frictional contact with said sprocket-wheel, substantially as described and for the purpose specified.

3. In a motor-vehicle hub, a stationary axle secured in the framework of the machine, a motor-driven sprocket-wheel journaled loosely upon the stationary axle, screw-threads formed upon said stationary axle, a sleeve threaded upon said screw-threads, a barrel constituting the outside shell of the hub, ball-bearings interposed between said barrel and sleeve, means for revolving said sleeve, a flange secured rigidly to the stationary axle, a frictional surface formed upon the inner face of the motor-driven sprocket-wheel, a flange formed upon each end of the barrel, one of said flanges adapted to be brought in frictional contact with the motor-driven sprocket-wheel when the sleeve is revolved in one direction, and the other flange adapted to be brought into frictional contact with the stationary flange upon the opposite end of the axle when the sleeve is revolved in the opposite direction, and the length of the barrel to be such that both of the flanges upon each of its ends can be held out of frictional contact with their opposed members when desired, and a sprocket-wheel adapted to be driven by foot-power secured to the said barrel, substantially as described and for the purpose specified.

4. In combination in a motor-vehicle hub, a stationary axle secured in the frame of the machine, a motor-driven sprocket-wheel journaled loosely upon said stationary axle, threads formed upon said stationary axle, a sleeve threaded upon said threads, a barrel or outside shell of the hub journaled upon said sleeve, a wrench secured to one end of said sleeve, an arm extending upward from said wrench, a connecting-rod secured to the upper end of said arm, by which the operator is adapted to rock said arm and wrench, and consequently revolve the sleeve in either direction, a friction-brake composed of a stationary and movable member, a stationary member adapted to be secured rigidly to the stationary axle, the movable member adapted to be secured to the barrel, a frictional surface formed upon the inner face of the motor-driven sprocket-wheel, a flange formed with the barrel of the hub and adapted to be brought into frictional contact with said sprocket-wheel, a sprocket-wheel arranged upon the barrel and adapted to be driven by foot-power, an automatic friction-clutch being interposed between said sprocket-wheel and barrel, substantially as described and for the purpose specified.

In testimony whereof I have hereunto affixed my signature in the presence of two subscribing witnesses.

FRANK LE FLEM.

Witnesses:
MARY E. HAMER,
L. W. MORRISON.